US012580220B2

(12) United States Patent
Xu et al.

(10) Patent No.: US 12,580,220 B2
(45) Date of Patent: Mar. 17, 2026

(54) HYBRID SOLID-STATE ELECTROLYTES AND METHODS OF FORMING THE SAME

(71) Applicants: GM GLOBAL TECHNOLOGY OPERATIONS LLC, Detroit, MI (US); WAYNE STATE UNIVERSITY, Detroit, MI (US)

(72) Inventors: Fan Xu, Oakland Township, MI (US); Robert D. Schmidt, Bloomfield Hills, MI (US); Mei Cai, Bloomfield Hills, MI (US); Manuela Ferreira Borras, Dearborn, MI (US); Yingxi Elaine Zhu, Troy, MI (US)

(73) Assignees: GM GLOBAL TECHNOLOGY OPERATIONS LLC, Detroit, MI (US); WAYNE STATE UNIVERSITY, Detroit, MI (US)

( * ) Notice: Subject to any disclaimer, the term of this patent is extended or adjusted under 35 U.S.C. 154(b) by 739 days.

(21) Appl. No.: 17/896,821

(22) Filed: Aug. 26, 2022

(65) Prior Publication Data

US 2024/0088430 A1 Mar. 14, 2024

(51) Int. Cl.
*H01M 10/056* (2010.01)

(52) U.S. Cl.
CPC .. *H01M 10/056* (2013.01); *H01M 2300/0071* (2013.01); *H01M 2300/0082* (2013.01); *H01M 2300/0097* (2013.01)

(58) Field of Classification Search
None
See application file for complete search history.

(56) References Cited

U.S. PATENT DOCUMENTS

2016/0049690 A1* 2/2016 Basak .................... C25B 13/08 252/62.2
2018/0034031 A1* 2/2018 Hammond-Cunningham ............ H01M 12/08

(Continued)

FOREIGN PATENT DOCUMENTS

CN 117638204 A 3/2024
DE 102023101713 A1 2/2024

OTHER PUBLICATIONS

Frederieke Langer et al.; "Impedance Spectroscopy Analysis of the Lithium Ion Transport Through the $Li_7La_3Zr_2O_{12}/P(EO)_{20}Li$ Interface"; Journal of the Electrochemical Society; 164; Aug. 5, 2017; pp. A2298-A2303.

(Continued)

*Primary Examiner* — Kevin M Bernatz
(74) *Attorney, Agent, or Firm* — Harness, Dickey & Pierce, P.L.C.

(57) ABSTRACT

A hybrid solid-state electrolyte layer for use in an electrochemical cell is provided. The hybrid solid-state electrolyte layer includes a polymeric material, a ceramic material, and an interfacial material adhering the polymeric material and the ceramic material. The interfacial material includes a branched copolymer that includes dopamine and a second monomer. The second monomer forms a polymeric moiety in the copolymer that is the same or similar to the polymeric material. In certain variations, the polymeric material defines a polymeric layer, the ceramic material defines a ceramic layer, and the interfacial material defines an interfacial layer that is disposed between the polymeric layer and the ceramic layer. In other variations, the polymeric material defines a polymeric matrix, the ceramic material defines a plurality of ceramic particles dispersed in the polymeric (Continued)

matrix, and the plurality of ceramic particles are coated with the interfacial material.

18 Claims, 6 Drawing Sheets

(56) References Cited

U.S. PATENT DOCUMENTS

| | | | | |
|---|---|---|---|---|
| 2019/0305358 | A1* | 10/2019 | Oh | H01M 4/0404 |
| 2020/0280038 | A1* | 9/2020 | Kim | H01M 50/414 |
| 2021/0344079 | A1* | 11/2021 | Bucur | H01M 10/056 |
| 2022/0190440 | A1* | 6/2022 | Moon | H01M 50/417 |
| 2022/0223926 | A1* | 7/2022 | He | H01M 50/489 |
| 2022/0311037 | A1* | 9/2022 | Shanmuganathan | H01M 8/1081 |

OTHER PUBLICATIONS

Takeshi Abe et al.; "Lithium-Ion Transfer at the Interface Between Lithium-Ion-Conductive Solid Crystalline Electrolyte and Polymer Electrolyte"; Journal of the Electrochemical Society; 151; Oct. 27, 2004; pp. A1950-A1953.

* cited by examiner

HYBRID SOLID-STATE ELECTROLYTES AND METHODS OF FORMING THE SAME

GOVERNMENT FUNDING

This invention was made with government support under Agreement No. NSF CMMI-1914436 awarded by the National Science Foundation. The Government may have certain rights in the invention.

INTRODUCTION

This section provides background information related to the present disclosure which is not necessarily prior art.

Electrochemical energy storage devices, such as lithium-ion batteries, can be used in a variety of products, including automotive products such as start-stop systems (e.g., 12V start-stop systems), battery-assisted systems ("μBAS"), Hybrid Electric Vehicles ("HEVs"), and Electric Vehicles ("EVs"). Typical lithium-ion batteries include two electrodes and an electrolyte component and/or separator. One of the two electrodes can serve as a positive electrode or cathode, and the other electrode can serve as a negative electrode or anode. A separator filled with a liquid or solid electrolyte may be disposed between the negative and positive electrodes. The electrolyte is suitable for conducting lithium ions between the electrodes and, like the two electrodes, may be in solid and/or liquid form and/or a hybrid thereof. In instances of solid-state batteries, which include solid-state electrodes and a solid-state electrolyte (or solid-state separator), the solid-state electrolyte (or solid-state separator) may physically separate the electrodes so that a distinct separator is not required.

Many different materials may be used to create components for a lithium-ion battery. For example, inorganic solid-state electrolytes have various benefits. For instance, inorganic ceramics can have high ionic conductivity. However, inorganic ceramics also have large interfacial resistances and are associated with various processing difficulties, including for example, because of brittleness. In contract, the processing of solid-state polymer electrolytes is often less challenging and solid-state polymer electrolytes have good flexibility, but the low room-temperature conductivity of most solid-state polymer electrolytes remains an ongoing obstacle. Hybrid solid-state electrolytes, including organic-inorganic solid-state electrolytes or hybrid polymer-ceramic solid-state electrolytes, may address many of the noted drawbacks of inorganic solid-state electrolytes and/or solid-state polymer electrolytes. However, large interfacial impedances are often observed when using such hybrid solid-state electrolytes at least in part because of the material incompatibilities between the organic or polymer material and the inorganic or ceramic material thereby reducing cell performance. Accordingly, it would be desirable to develop improved battery materials that can address these challenges.

SUMMARY

This section provides a general summary of the disclosure, and is not a comprehensive disclosure of its full scope or all of its features.

The present disclosure relates to solid-state batteries, and more specifically, to hybrid solid-state electrolytes for solid-state batteries, as well as to methods of making and using the same.

In various aspects, the present disclosure provides a hybrid solid-state electrolyte layer for use in an electrochemical cell that cycles lithium ions. The hybrid solid-state electrolyte layer may include a polymeric material, a solid-state electrolyte ceramic material, and an interfacial material adhering the polymeric material and the solid-state electrolyte ceramic material, where the interfacial material includes a branched copolymer that includes dopamine and a second monomer.

In one aspect, the hybrid solid-state electrolyte layer may include greater than or equal to about 20 wt. % to less than or equal to about 90 wt. % of the polymeric material, greater than or equal to about 10 wt. % to less than or equal to about 80 wt. % of the solid-state electrolyte ceramic material, and greater than or equal to about 0.01 wt. % to less than or equal to about 1 wt. % of the interfacial material.

In one aspect, the hybrid solid-state electrolyte layer may have an average thickness greater than or equal to about 5 micrometers to less than or equal to about 200 micrometers.

In one aspect, the polymeric material may define a polymeric layer, the solid-state electrolyte ceramic material may define a solid-state electrolyte ceramic layer, and the interfacial material may define an interfacial layer that is disposed between the polymeric layer and the solid-state electrolyte ceramic layer.

In one aspect, the polymeric layer may have an average thickness greater than or equal to about 1 micrometer to less than or equal to about 120 micrometers, the solid-state electrolyte ceramic layer may have an average thickness greater than or equal to about 5 micrometers to less than or equal to about 1000 micrometers, and the interfacial layer may have an average thickness greater than or equal to about 10 nanometers to less than or equal to about 10 micrometers.

In one aspect, the polymeric material may define a polymeric matrix and the solid-state electrolyte ceramic material may defines a plurality of solid-state electrolyte ceramic particles that are dispersed in the polymeric matrix, where the solid-state electrolyte ceramic particles are coated with the interfacial material.

In one aspect, the solid-state electrolyte ceramic particles may have an average particle size greater than or equal to about 10 nanometers to less than or equal to about 10 micrometers, and the interfacial material may have an average thickness greater than or equal to about 2 nanometers to less than or equal to about 10 nanometers.

In one aspect, the polymeric material may be selected from the group consisting of: polyethylene oxide (PEO), poly(methacrylic acid) (PMMA), poly(vinylidene fluoride) (PVDF), poly(vinylidene fluoride)-co-hexafluoropropylene (PVDF-HFP), poly(acrylonitrile) (PAN), poly(2-vinylpyridine) (P2VP), polyethylenimine (PEI), poly(propylene oxide) (PPO), and combinations thereof.

In one aspect, the solid-state electrolyte ceramic material may be selected from the group consisting of: lithium lanthanum zirconium oxide ($Li_7La_3Zr_2O_{12}$) (LLZO), lithium lanthanum titanate ($Li_{0.33}La_{0.56}TiO_3$), lithium zinc germanate ($Li_{14}Zn(GeO_4)_4$), and combinations thereof.

In one aspect, the second monomer forms a polymeric moiety in the copolymer selected from the group consisting of: polyethylene oxide (PEO), poly(methacrylic acid) (PMMA), poly(vinylidene fluoride) (PVDF), poly(vinylidene fluoride)-co-hexafluoropropylene (PVDF-HFP), poly(acrylonitrile) (PAN), poly(2-vinylpyridine) (P2VP), polyethylenimine (PEI), poly(propylene oxide) (PPO), and combinations thereof.

In various aspects, the present disclosure provides a hybrid solid-state electrolyte layer for use in an electrochemical cell that cycles lithium ions. The hybrid solid-state electrolyte layer may include a first polymeric material defining a polymeric matrix, a plurality of solid-state electrolyte ceramic material particles, and an interfacial material adhering the polymeric matrix to the solid-state electrolyte ceramic material particles. The interfacial material may include a branched copolymer that includes dopamine and a second monomer that forms a second polymeric moiety, where the first polymeric material and the second polymeric moiety are the same.

In one aspect, the polymeric matrix may form a first layer, the plurality of solid-state electrolyte ceramic material particles may form a second layer, and the interfacial material may define a third layer disposed between the first layer and the second layer.

In one aspect, the first layer may have an average thickness greater than or equal to about 1 micrometer to less than or equal to about 120 micrometers, the second layer may have an average thickness greater than or equal to about 5 micrometers to less than or equal to about 1000 micrometers, and the third layer may have an average thickness greater than or equal to about 10 nanometers to less than or equal to about 10 micrometers.

In one aspect, the plurality of soldi-state electrolyte ceramic material particles may be dispersed in the polymeric matrix and the interfacial material may coat the solid-state electrolyte ceramic material particles.

In one aspect, the polymeric matrix may have an average thickness greater than or equal to about 5 micrometers to less than or equal to about 200 micrometers, the solid-state electrolyte ceramic particles may have an average particle size greater than or equal to about 10 nanometers to less than or equal to about 10 micrometers, and the interfacial material may have an average thickness greater than or equal to about 2 nanometers to less than or equal to about 10 nanometers.

In one aspect, the first polymeric material and the second polymeric moiety may selected from the group consisting of: polyethylene oxide (PEO), poly(methacrylic acid) (PMMA), poly(vinylidene fluoride) (PVDF), poly(vinylidene fluoride)-co-hexafluoropropylene (PVDF-HFP), poly(acrylonitrile) (PAN), poly(2-vinylpyridine) (P2VP), polyethylenimine (PEI), poly(propylene oxide) (PPO), and combinations thereof, and the ceramic material particles may include a ceramic material selected from the group consisting of: lithium lanthanum zirconium oxide ($Li_7La_3Zr_2O_{12}$) (LLZO), lithium lanthanum titanate ($Li_{0.33}La_{0.56}TiO_3$), lithium zinc germanate ($Li_{14}Zn(GeO_4)_4$), and combinations thereof.

In various aspects, the present disclosure provides a method for forming a hybrid solid-state electrolyte layer for use in an electrochemical cell that cycles lithium ions. The method may include preparing a receiving surface on a polymeric material or a solid-state electrolyte ceramic material and contacting an interfacial material to the receiving surface, where the interfacial material includes a branched copolymer and the branched copolymer includes dopamine and a second polymeric moiety selected from the group consisting of: polyethylene oxide (PEO), poly(methacrylic acid) (PMMA), poly(vinylidene fluoride) (PVDF), poly(vinylidene fluoride)-co-hexafluoropropylene (PVDF-HFP), poly(acrylonitrile) (PAN), poly(2-vinylpyridine) (P2VP), polyethylenimine (PEI), poly(propylene oxide) (PPO), and combinations thereof.

In one aspect, the preparing may include treating the surface to remove contaminants and passivating materials.

In one aspect, the contacting may include a solution-based coating process.

In one aspect, the receiving surface is on the ceramic material and the method further includes contacting the interfacial material with the polymeric material.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
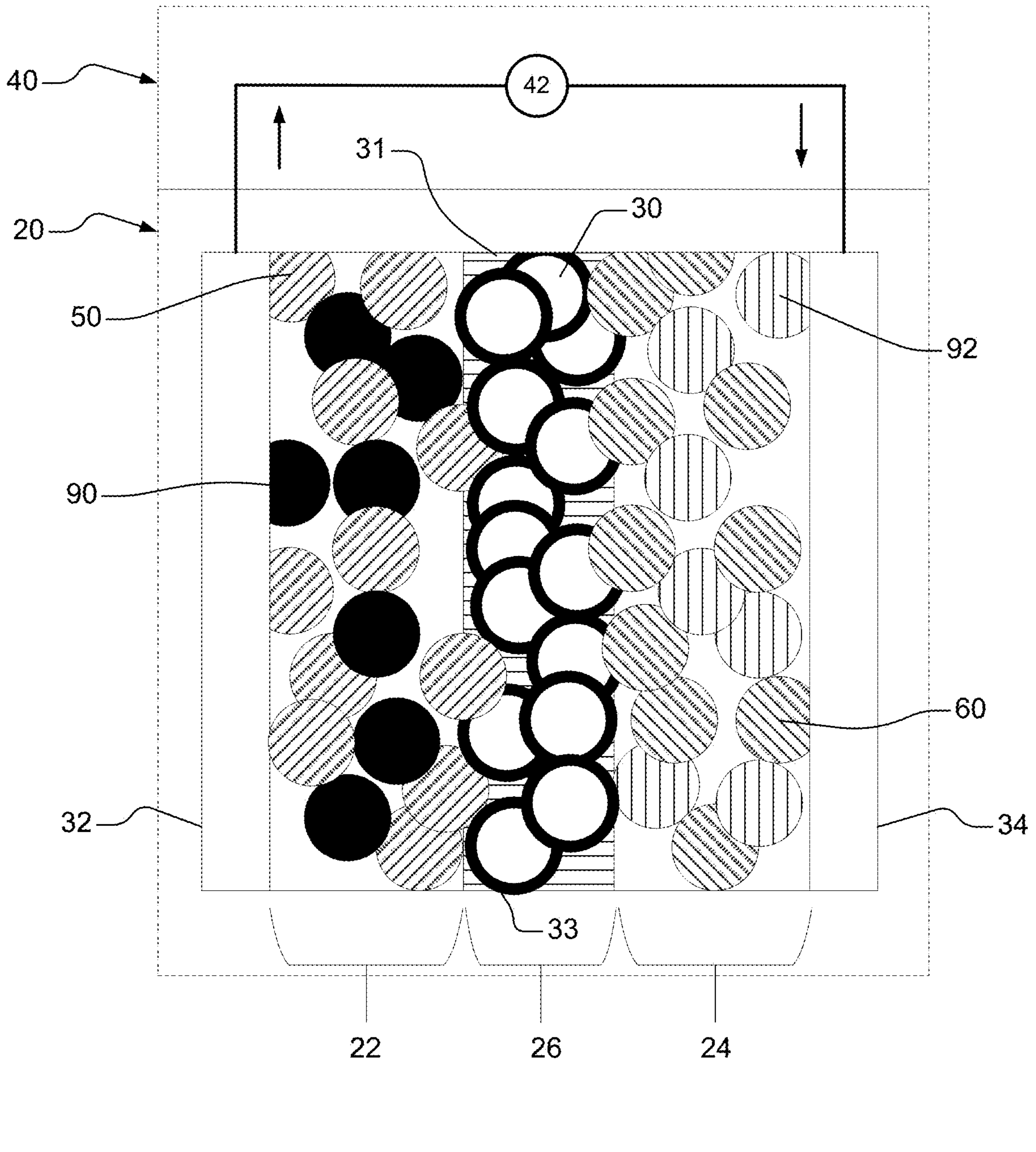
FIG. 1 is an illustration of an example solid-state battery including a hybrid solid-state electrolyte layer in accordance with various aspects of the present disclosure.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected, or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer, or section. Terms such as "first," "second," and other numerical terms when used herein do not imply a sequence or order unless clearly indicated by the context. Thus, a first step, element, component, region, layer, or section discussed below could be termed a second step, element, component, region, layer, or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

The current technology pertains to solid-state batteries (SSBs) including hybrid solid-state electrolyte, and also, to method of forming and using the same. Solid-state batteries may include at least one solid component, for example, at least one solid electrode, but may also include semi-solid or gel, liquid, or gas components in certain variations. Solid-state batteries may have a bipolar stacking design comprising a plurality of bipolar electrodes where a first mixture of solid-state electroactive material particles (and optional solid-state electrolyte particles) is disposed on a first side of a current collector, and a second mixture of solid-state electroactive material particles (and optional solid-state electrolyte particles) is disposed on a second side of a current collector that is parallel with the first side. The first mixture may include, as the solid-state electroactive material particles, cathode material particles. The second mixture may include, as solid-state electroactive material particles, anode material particles. The solid-state electrolyte particles in each instance may be the same or different.

In other variations, the solid-state batteries may have a monopolar stacking design comprising a plurality of monopolar electrodes where a first mixture of solid-state electroactive material particles (and optional solid-state electrolyte particles) is disposed on both a first side and a second side of a first current collector, where the first and second side are substantially parallel, and a second mixture of solid-state electroactive material particles (and optional solid-state electrolyte particles) is disposed on both a first side and a second side of a second current collector. The first mixture may include, as the solid-state electroactive material particles, cathode material particles. The second mixture may include, as solid-state electroactive material particles, anode material particles. The solid-state electrolyte particles in each instance may be the same or different.

In each instance, the solid-state batteries may be incorporated into energy storage devices, like rechargeable lithium-ion batteries, which may be used in automotive transportation applications (e.g., motorcycles, boats, tractors, buses, mobile homes, campers, and tanks). The present technology, however, may also be used in other electrochemical devices, including aerospace components, consumer goods, devices, buildings (e.g., houses, offices, sheds, and warehouses), office equipment and furniture, and industrial equipment machinery, agricultural or farm equipment, or heavy machinery, by way of non-limiting example. In various aspects, the present disclosure provides a rechargeable lithium-ion battery that exhibits high temperature tolerance, as well as improved safety and superior power capability and life performance.

An exemplary and schematic illustration of a solid-state electrochemical cell unit (also referred to as a "solid-state battery" and/or "battery") 20 that cycles lithium ions is shown in FIG. 1. The battery 20 includes a negative electrode (e.g., anode) 22, a positive electrode (e.g., cathode) 24, and an electrolyte layer 26 that occupies a space defined between the two or more electrodes 22, 24. The electrolyte layer 26 is a solid-state or semi-solid state separating layer that physically separates the negative electrode 22 from the positive electrode 24, and may be in certain variations, as further detailed below, a hybrid solid-state electrolyte layer. The hybrid solid-state electrolyte layer 26 may include a first plurality of solid-state electrolyte particles 30. A second plurality of solid-state electrolyte particles 90 may be mixed with negative solid-state electroactive particles 50 in the negative electrode 22, and a third plurality of solid-state electrolyte particles 92 may be mixed with positive solid-state electroactive particles 60 in the positive electrode 24, so as to form a continuous electrolyte network, which may be a continuous lithium-ion conduction network.

A first or negative electrode current collector 32 may be positioned at or near the negative electrode 22. The first current collector 32 together with the negative electrode 22 may be referred to as a negative electrode assembly. The first current collector 32 may be a metal foil, metal grid or screen, or expanded metal comprising copper or any other appropriate electrically conductive material known to those of skill in the art. A second or positive electrode current collector 34 may be positioned at or near the positive electrode 24. The second current collector 32 with the positive electrode 24 may be referred to as a positive electrode assembly. The second current collector 34 may be a metal foil, metal grid or screen, or expanded metal comprising aluminum or any other appropriate electrically conductive material known to those of skill in the art.

Although not illustrated, the skilled artisan will recognize that in certain variations, the first current collector 32 may be a first bipolar current collector and/or the second current collector 34 may be a second bipolar current collector. For example, the first current collector 34 and/or the second current collector 34 may be cladded foils, for example, where one side (e.g., the first side or the second side) of the current collector 32, 34 includes one metal (e.g., first metal) and another side (e.g., the other side of the first side or the second side) of the current collector 32 includes another metal (e.g., second metal). The cladded foils may include, for example, aluminum-copper (Al—Cu), nickel-copper (Ni—Cu), stainless steel-copper (SS-Cu), aluminum-nickel (Al—Ni), aluminum-stainless steel (Al-SS), and nickel-stainless steel (Ni-SS). In certain variations, the first current collector 32 and/or second current collectors 34 may be pre-coated, such as graphene or carbon-coated aluminum current collectors.

In each instance, the first current collector 32 and the second current collector 34 respectively collect and move free electrons to and from an external circuit 40. For example, an interruptible external circuit 40 and a load device 42 may connect the negative electrode 22 (through the first current collector 32) and the positive electrode 24 (through the second electrode current collector 34). The battery 20 can generate an electric current (indicated by arrows in FIG. 1) during discharge by way of reversible electrochemical reactions that occur when the external circuit 40 is closed (to connect the negative electrode 22 and the positive electrode 24) and when the negative electrode 22 has a lower potential than the positive electrode 24. The chemical potential difference between the negative electrode 22 and the positive electrode 24 drives electrons produced by a reaction, for example, the oxidation of intercalated lithium, at the negative electrode 22, through the external circuit 40 towards the positive electrode 24. Lithium ions, which are also produced at the negative electrode 22, are concurrently transferred through the electrolyte layer 26 towards the positive electrode 24. The electrons flow through the external circuit 40 and the lithium ions migrate across the electrolyte layer 26 to the positive electrode 24, where they may be plated, reacted, or intercalated. The electric current passing through the external circuit 40 can be harnessed and directed through the load device 42 (in the direction of the arrows) until the lithium in the negative electrode 22 is depleted and the capacity of the battery 20 is diminished.

The battery 20 can be charged or reenergized at any time by connecting an external power source (e.g., charging device) to the battery 20 to reverse the electrochemical reactions that occur during battery discharge. The external power source that may be used to charge the battery 20 may vary depending on the size, construction, and particular end-use of the battery 20. Some notable and exemplary external power sources include, but are not limited to, an AC-DC converter connected to an AC electrical power grid though a wall outlet and a motor vehicle alternator. The connection of the external power source to the battery 20 promotes a reaction, for example, non-spontaneous oxidation of intercalated lithium, at the positive electrode 24 so that electrons and lithium ions are produced. The electrons, which flow back towards the negative electrode 22 through the external circuit 40, and the lithium ions, which move across the electrolyte layer 26 back towards the negative electrode 22, reunite at the negative electrode 22 and replenish it with lithium for consumption during the next battery discharge cycle. As such, a complete discharging event followed by a complete charging event is considered to be a cycle, where lithium ions are cycled between the positive electrode 24 and the negative electrode 22.

Although the illustrated example includes a single positive electrode 24 and a single negative electrode 22, the skilled artisan will recognize that the current teachings apply to various other configurations, including those having one or more cathodes and one or more anodes, as well as various current collectors and current collector films with electroactive particle layers disposed on or adjacent to or embedded within one or more surfaces thereof. Likewise, it should be recognized that the battery 20 may include a variety of other components that, while not depicted here, are nonetheless known to those of skill in the art. For example, the battery 20 may include a casing, a gasket, terminal caps, and any other conventional components or materials that may be situated within the battery 20, including between or around the negative electrode 22, the positive electrode 24, and/or the solid-state electrolyte layer 26.

In many configurations, each of the negative electrode current collector 32, the negative electrode 22, the electrolyte layer 26, the positive electrode 24, and the positive electrode current collector 34 can be prepared as relatively thin layers (for example, from several microns to a millimeter or less in thickness) and assembled in layers connected in series arrangement to provide a suitable electrical energy, battery voltage and power package, for example, to yield a Series-Connected Elementary Cell Core ("SECC"). In various other instances, the battery 20 may further include electrodes 22, 24 connected in parallel to provide suitable electrical energy, battery voltage, and power for example, to yield a Parallel-Connected Elementary Cell Core ("PECC").

The size and shape of the battery 20 may vary depending on the particular applications for which it is designed. Battery-powered vehicles and hand-held consumer electronic devices are two examples where the battery 20 would most likely be designed to different size, capacity, voltage, energy, and power-output specifications. The battery 20 may also be connected in series or parallel with other similar lithium-ion cells or batteries to produce a greater voltage output, energy, and power if it is required by the load device 42. The battery 20 can generate an electric current to the load device 42 that can be operatively connected to the external circuit 40. The load device 42 may be fully or partially powered by the electric current passing through the external circuit 40 when the battery 20 is discharging. While the load device 42 may be any number of known electrically-powered devices, a few specific examples of power-consuming load devices include an electric motor for a hybrid vehicle or an all-electric vehicle, a laptop computer, a tablet computer, a cellular phone, and cordless power tools or appliances, by way of non-limiting example. The load device 42 may also be an electricity-generating apparatus that charges the battery 20 for purposes of storing electrical energy.

With renewed reference to FIG. 1, the hybrid solid-state electrolyte layer 26 provides electrical separation—preventing physical contact—between the negative electrode 22 and the positive electrode 24. The hybrid solid-state electrolyte layer 26 also provides a minimal resistance path for internal passage of ions. In various aspects, as noted above, the hybrid solid-state electrolyte layer 26 includes a first plurality of solid-state electrolyte particles 30. For example, the hybrid solid-state electrolyte layer 26 may be in the form of a layer or a composite that comprises the first plurality of solid-state electrolyte particles 30. The hybrid solid-state electrolyte layer 26 may be in the form of a layer having an average thickness greater than or equal to about 5 μm to less than or equal to about 200 μm, optionally greater than or equal to about 10 μm to less than or equal to about 100 μm, optionally about 40 μm, and in certain aspects, optionally about 20 μm.

The hybrid solid-state electrolyte layer 26 may also include a polymeric matrix 31 and an interfacial material 33 that coat each of the solid-state electrolyte particles 30 and physically/electrochemically adheres the solid-state electrolyte particles 30 and the polymeric matrix 31. In certain variations, an average particle size of the solid-state electrolyte particles 30 may be greater than or equal to about 10 nanometers (nm) to less than or equal to about 10 μm, and in certain aspects, optionally greater than or equal to about 25 nm to less than or equal to about 500 nm, and an average thickness of the interfacial material 33 may be greater than or equal to about 0.1 nm to less than or equal to about 50 nm, and in certain aspects, optionally greater than or equal to about 2 nm to less than or equal to about 10 nm.

In various aspects, the hybrid solid-state electrolyte layer 26 may include greater than or equal to about 10 wt. % to less than or equal to about 80 wt. %, and in certain aspects, optionally greater than or equal to about 30 wt. % to less than or equal to about 60 wt. %, of the solid-state electrolyte particles 30; greater than or equal to about 20 wt. % to less than or equal to about 90 wt. %, and in certain aspects, optionally greater than or equal to about 40 wt. % to less than or equal to about 70 wt. %, of the polymeric matrix 31; and greater than or equal to about 0.01 wt. % to less than or equal to about 1 wt. %, and in certain aspects, optionally greater than or equal to about 0.05 wt. % to less than or equal to about 0.5 wt. %, of the interfacial material 33.

The solid-state electrolyte particles 30 may be ceramic particles including a garnet-type such as lithium lanthanum zirconium oxide ($Li_7La_3Zr_2O_{12}$) (LLZO), a perovskite-type such as lithium lanthanum titanate ($Li_{0.33}La_{0.56}TiO_3$), and/or a LiSICON-type such as lithium zinc germanate ($Li_{14}Zn(GeO_4)_4$), and the polymeric matrix 31 may include polyethylene oxide (PEO), poly(methacrylic acid) (PMMA), poly(vinylidene fluoride) (PVDF), poly(vinylidene fluoride)-co-hexafluoropropylene (PVDF-HFP), poly(acrylonitrile) (PAN), poly(2-vinylpyridine (P2VP), polyethylenimine (PEI), poly(propylene oxide) (PPO), blends of polyethylene oxides (PEO) and the above mentioned materials, and combinations thereof.

The interfacial material 33 may include a branched copolymer having good adhesion properties and including two distinct monomers, and in certain aspects, two distinct oligomers formed from distinct monomers. For example, the first monomer may be dopamine, which forms a first oligomer that may be polydopamine (PDA). The second monomer may be selected to form a polymeric moiety (in the copolymer) selected from the group consisting of: polyethylene oxide (PEO), poly(methacrylic acid) (PMMA), poly(vinylidene fluoride) (PVDF), poly(vinylidene fluoride)-co-hexafluoropropylene (PVDF-HFP), poly(acrylonitrile) (PAN), poly(2-vinylpyridine) (P2VP), polyethylenimine (PEI), poly(propylene oxide) (PPO), and combinations thereof. For example, in certain variations, the polymeric moiety prepared from the second monomer may be represented by

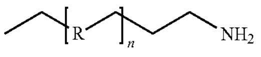

where R is any chain with conductive properties that resembles the polymeric matrix 31 and 20≤n≤5,000. The molecular weight, morphology, and chemical structure of the polymeric moiety can be used to tune the size and properties of the resulting interfacial material 33. For example, the network structure can be varied by using a more branched polymer as opposed to a linear polymer; the thermal stability of the material can be varied by using a polymer with optimum thermal properties; and/or larger concentration or molecular weight can vary the ratios in the copolymer and result in varied size and overall distribution.

Figure 3:
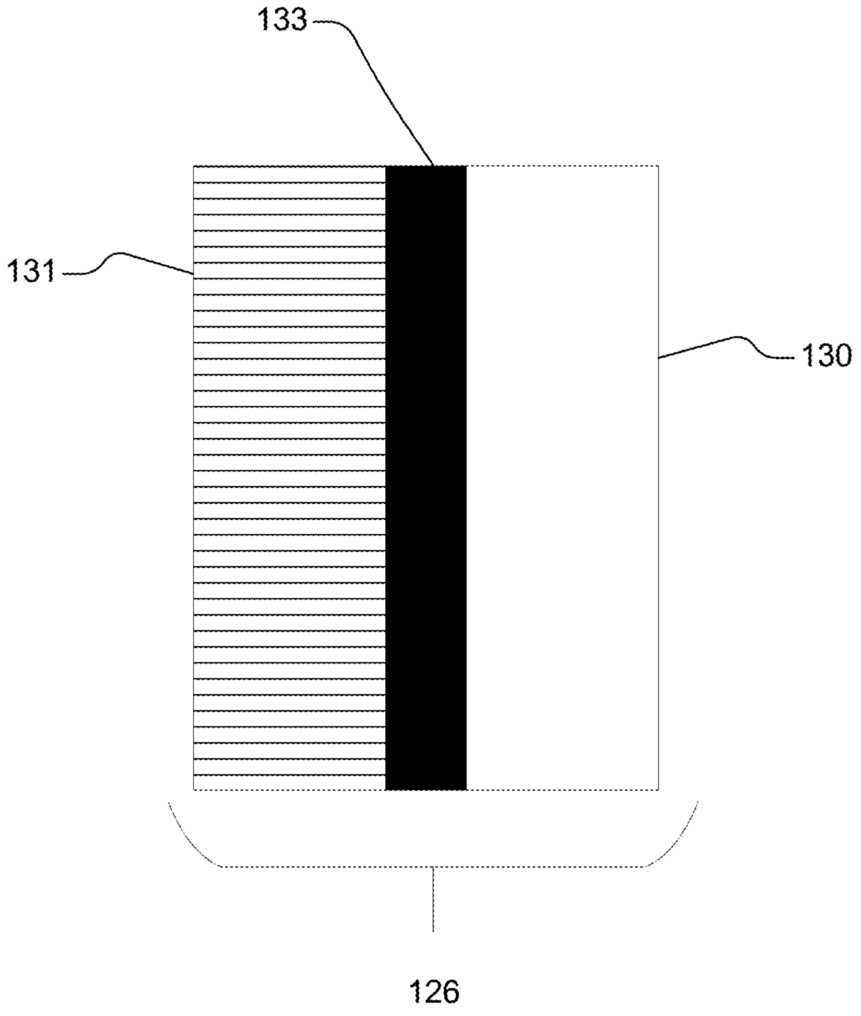
FIG. 3 is an illustration of an example hybrid solid-state electrolyte in accordance with various aspects of the present disclosure.

In various aspects, the hybrid solid-state electrolyte layer 26 illustrated in FIG. 1 may be a substituted for a multi-layered, hybrid solid-state electrolyte layer, like the multi-layered, hybrid solid-state electrolyte 126 illustrated in FIG. 3. As illustrated, the multi-layered, hybrid solid-state electrolyte 126 may include a first or polymeric layer 131 substantially parallel with a second or ceramic layer 130 where a third or interfacial layer 133 physically/electrochemically adheres the polymeric layer 131 and the ceramic layer 130. In certain variations, the polymeric layer 131 may have a first average thickness greater than or equal to about 1 μm to less than or equal to about 120 μm, and in certain aspects, optionally greater than or equal to about 5 μm to less than or equal to about 60 μm; the ceramic layer 130 may have a second average thickness greater than or equal to about 5 μm to less than or equal to about 1 mm, and in certain aspects, optionally greater than or equal to about 10 μm to less than or equal to about 100 μm; and the interfacial layer 133 may have a third average thickness greater than or equal to about 10 nm to less than or equal to about 10 μm, and in certain aspects, optionally greater than or equal to about 50 nm to less than or equal to about 1 μm, while the hybrid solid-state electrolyte 126 has an overall average thickness greater than or equal to about 6 μm to less than or equal to about 1,060 μm, and in certain aspects, optionally greater than or equal to about 15 to less than or equal to about 160 μm.

Like the polymeric matrix 31 illustrated in FIG. 1, the polymeric layer 131 may include one or more polymers materials selected from polyethylene oxide (PEO), poly (methacrylic acid) (PMMA), poly(vinylidene fluoride) (PVDF), poly(vinylidene fluoride)-co-hexafluoropropylene (PVDF-HFP), poly(acrylonitrile) (PAN), poly(2-vinylpyridine) (P2VP), polyethylenimine (PEI), poly(propylene oxide) (PPO), blends of polyethylene oxides (PEO) and the above mentioned materials, and combinations thereof. Although not illustrated, it should be recognized that the ceramic layer 130 includes a plurality of solid-state electroactive material or ceramic particles. Like the ceramic particles 30 illustrated in FIG. 1, the ceramic particles defining the ceramic layer 130 may a garnet-type such as lithium lanthanum zirconium oxide ($Li_7La_3Zr_2O_{12}$) (LLZO), a perovskite-type such as lithium lanthanum titanate ($Li_{0.33}La_{0.56}TiO_3$), and/or a LiSICON-type such as lithium zinc germanate ($Li_{14}Zn(GeO_4)_4$). Further still, like the interfacial material 33 illustrated in FIG. 1, the interfacial layer 133 may include a branched copolymer having good adhesion properties and including dopamine (e.g., polydopamine (PDA)) and any second monomer (e.g., functionalized or amine-containing polymer) that forms a polymeric moiety that has similar structure to the polymeric matrix 31.

Figure 2A:
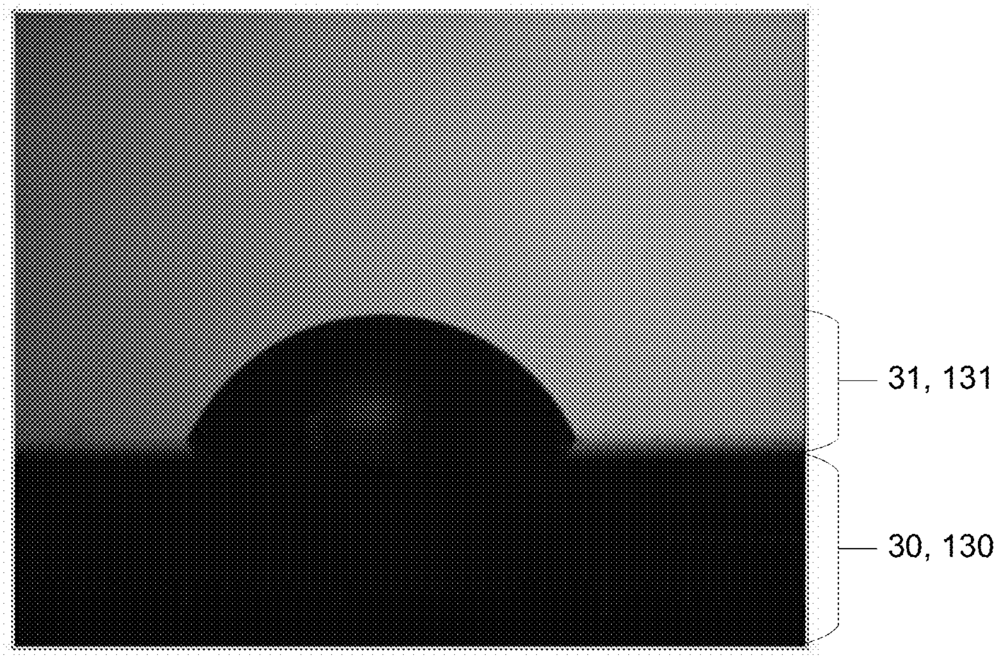
FIG. 2A is a high resolution image of an example hybrid solid-state electrolyte layer omitting an interfacial material.
Figure 2B:
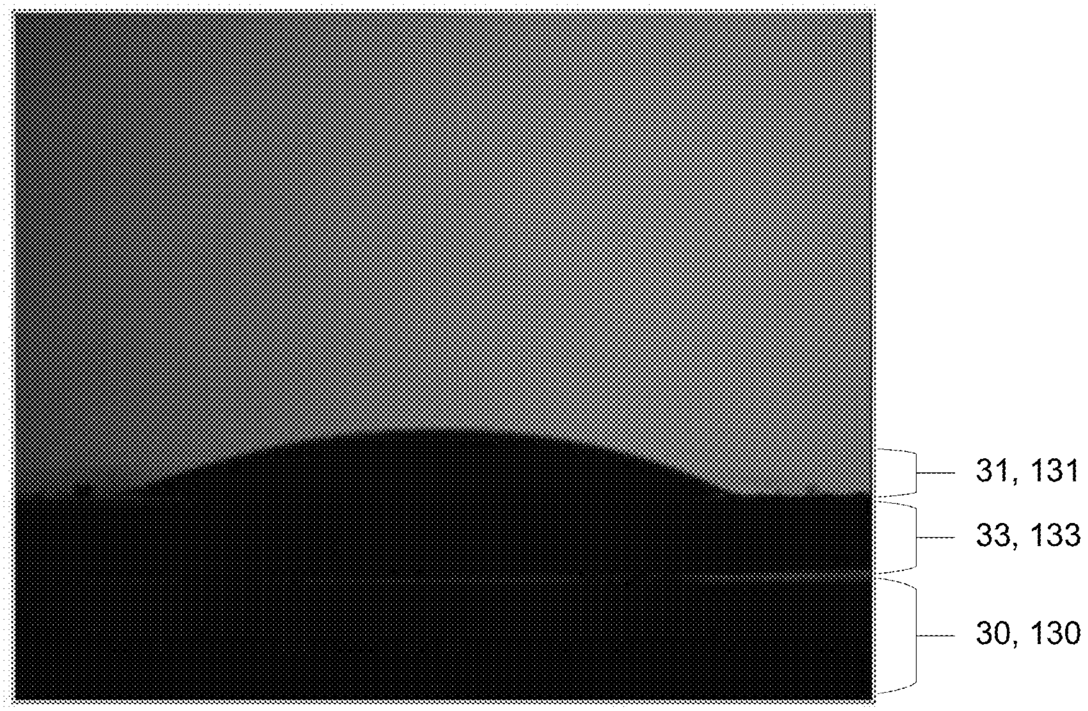
FIG. 2B is a high resolution image of an example hybrid solid-state electrolyte layer including an interfacial material in accordance with various aspects of the present disclosure.

In each instance, the inclusion of the interfacial material 33 between the polymeric matrix 31 and the ceramic particles 30, or interfacial layer 130 between the polymeric layer 131 and the ceramic layer 130, can help to improve interfacial properties of the hybrid solid-state electrolyte layer 26, 126, including improving interface compatibility, and also, reduce interfacial impedance, between the polymeric material 31, 131 and the ceramic particles 30, 130. The outstanding adhesion properties of polydopamine to both ceramic and polymer interfaces and the compatibility from copolymerizing with a material with similar backbone to that of the polymeric matrix 31 and/or polymeric layer 131 improves the wetting between the two materials thereby resulting in lower interfacial resistance. In certain variations, the interfacial material 33, 133 may also help to improve ionic conductivity of the hybrid solid-state electrolyte layer 26. By way of example only, FIG. 2A is an optical image of an example hybrid solid-state electrolyte layer omitting an interfacial material, while FIG. 2B is an optical image of an example hybrid solid-state electrolyte layer including an interfacial material in accordance with various aspects of the present disclosure. As illustrated, the interfacial material 33, 133 may improve the wettability of the polymeric material 31, 131 with respect to the ceramic particles 30, 130 and the contact angle may decrease from about 73 degrees to 21 degrees.

With renewed reference to FIG. 1, the negative electrode 22 may be formed from a lithium host material that is capable of functioning as a negative terminal of a lithium-ion battery. In various aspects, as illustrated, the negative electrode 22 may be defined by a plurality of negative electroactive material particles 50. Such negative electroactive material particles 50 may be disposed in one or more layers so as to define the three-dimensional structure of the negative electrode 22. In certain variations, as illustrated, the negative electrode 22 may be a composite electrode comprising a second plurality of solid-state electrolyte particles 90 in combination with the negative electroactive material particles 50. For example, the negative electrode 22 may include greater than or equal to about 30 wt. % to less than or equal to about 98 wt. %, and in certain aspects, optionally greater than or equal to about 50 wt. % to less than or equal to about 95 wt. %, of the negative solid-state electroactive particles 50, and greater than or equal to about 0 wt. % to less than or equal to about 50 wt. %, and in certain aspects, optionally greater than or equal to about 5 wt. % to less than or equal to about 20 wt. %, of the second plurality of solid-state electrolyte particles 90. In each instance, the negative electrode 22 (including the one or more layers) may have an average thickness greater than or equal to about 0 nm to less than or equal to about 500 μm, optionally greater than or equal to about 1 μm to less than or equal to about 500 μm, and in certain aspects, optionally greater than or equal to about 10 μm to less than or equal to about 200 μm.

The second plurality of solid-state electrolyte particles 90 may be the same as or different from the first plurality of solid-state electrolyte particles 30. For example, in certain variations, like the solid-state electrolyte particles 30, the solid-state electrolyte particles 90 may include ceramic particles. In other variations, the solid-state electrolyte particles 90 may include, additionally or alternatively, sulfide-based particles, oxide-based particles, metal-doped or aliovalent-substituted oxide particles, nitride-based particles, hydride-based particles, halide-based particles, and/or borate-based particles.

In certain variations, the oxide-based particles may comprise one or more garnet ceramics, LISICON-type oxides, NASICON-type oxides, and Perovskite type ceramics. The garnet ceramics may be selected from the group consisting of: $Li_7La_3Zr_2O_{12}$, $Li_{6.2}Ga_{0.3}La_{2.95}Rb_{0.05}Zr_2O_{12}$, $Li_{6.85}La_{2.9}Ca_{0.1}Zr_{1.75}Nb_{0.25}O_{12}$, $Li_{6.25}Al_{0.25}La_3Zr_2O_{12}$, $Li_{6.75}La_3Zr_{1.75}Nb_{0.25}O_{12}$, and combinations thereof. The LISICON-type oxides may be selected from the group consisting of: $Li_{2+2x}Zn_{1-x}GeO_4$ (where $0<x<1$), $Li_{14}Zn(GeO_4)_4$, $Li_{3+x}(P_{1-x}Si_x)O_4$ (where $0<x<1$), $Li_{3+x}Ge_xV_{1-x}O_4$ (where $0<x<1$), and combinations thereof. The NASICON-type oxides may be defined by $LiMM'(PO_4)_3$, where M and M' are independently selected from Al, Ge, Ti, Sn, Hf, Zr, and La. For example, in certain variations, the NASICON-type oxides may be selected from the group consisting of: $Li_{1+x}Al_xGe_{2-x}(PO_4)_3$ (LAGP) (where $0\leq x\leq 2$), $Li_{1.4}Al_{0.4}Ti_{1.6}(PO_4)_3$, $Li_{1.3}Al_{0.3}Ti_{1.7}(PO_4)_3$, $LiTi_2(PO_4)_3$, $LiGeTi(PO_4)_3$, $LiGe_2(PO_4)_3$, $LiHf_2(PO_4)_3$, and combinations thereof. The Perovskite-type ceramics may be selected from the group consisting of: $Li_{3.3}La_{0.53}TiO_3$, $LiSr_{1.65}Zr_{1.3}Ta_{1.7}O_9$, $Li_{2x-y}Sr_{1-x}Ta_yZr_{1-y}O_3$ (where $x=0.75y$ and $0.60<y<0.75$), $Li_{3/8}Sr_{7/16}Nb_{3/4}Zr_{1/4}O_3$, $Li_{3x}La_{(2/3-x)}TiO_3$ (where $0<x<0.25$), and combinations thereof.

The sulfide-based particles may include, for example, a pseudobinary sulfide, a pseudoternary sulfide, and/or a pseudoquaternary sulfide. Example pseudobinary sulfide systems include $Li_2S—P_2S_5$ systems (such as, $Li_3PS_4$, $Li_7P_3S_{11}$, and $Li_{9.6}P_3S_{12}$), $Li_2S—SnS_2$ systems (such as, $Li_4SnS_4$), $Li_2S—SiS_2$ systems, $Li_2S—GeS_2$ systems, $Li_2S—B_2S_3$ systems, $Li_2S—Ga_2S_3$ system, $Li_2S—P_2S_3$ systems, and $Li_2S—Al_2S_3$ systems. Example pseudoternary sulfide systems include $Li_2O—Li_2S—P_2S_5$ systems, $Li_2S—P_2S_5—P_2O_5$ systems, $Li_2S—P_2S_5—GeS_2$ systems (such as, $Li_{3.25}Ge_{0.25}P_{0.75}S_4$ and $Li_{10}GeP_2S_{12}$), $Li_2S—P_2S_5—LiX$ systems (where X is one of F, Cl, Br, and I) (such as, $Li_6PS_5Br$, $Li_6PS_5Cl$, $L_7P_2S_8I$, and $Li_4PS_4I$), $Li_2S—As_2S_5—SnS_2$ systems (such as, $Li_{3.833}Sn_{0.833}As_{0.166}S_4$), $Li_2S—P_2S_5—Al_2S_3$ systems, $Li_2S—LiX—SiS_2$ systems (where X is one of F, Cl, Br, and I), $0.4LiI·0.6Li_4SnS_4$, and $Li_{11}Si_2PS_{12}$. Example pseudoquaternary sulfide systems include $Li_2O—Li_2S—P_2S_5—P_2O_5$ systems, $Li_{9.54}Si_{1.74}P_{1.44}S_{11.7}Cl_{0.3}$, $Li_7P_{2.9}Mn_{0.1}S_{10.7}I_{0.3}$, and $Li_{10.35}[Sn_{0.27}Si_{1.08}]P_{1.65}S_{12}$.

The metal-doped or aliovalent-substituted oxide particles may include, for example, aluminum (Al) or niobium (Nb) doped $Li_7La_3Zr_2O_{12}$, antimony (Sb) doped $Li_7La_3Zr_2O_{12}$, gallium (Ga) doped $Li_7La_3Zr_2O_{12}$, chromium (Cr) and/or vanadium (V) substituted $LiSn_2P_3O_{12}$, aluminum (Al) substituted $Li_{1+x+y}Al_xTi_{2-x}Si_yP_{3-y}O_{12}$ (where $0<x<2$ and $0<y<3$), and combinations thereof. The nitride-based particles may include, for example, $Li_3N$, $Li_7PN_4$, $LiSi_2N_3$, and combinations thereof. The hydride-based particles may include, for example, $LiBH_4$, $LiBH_4—LiX$ (where x=Cl, Br, or I), $LiNH_2$, $Li_2NH$, $LiBH_4—LiNH_2$, $Li_3AlH_6$, and combinations thereof. The halide-based particles may include, for example, LiI, $Li_3InCl_6$, $Li_2CdC_{14}$, $Li_2MgCl_4$, $LiCdI_4$, $Li_2ZnI_4$, $Li_3OCl$, $Li_3YCl_6$, $Li_3YBr_6$, and combinations thereof. The borate-based particles may include, for example, $Li_2B_4O_7$, $Li_2O—B_2O_3—P_2O_5$, and combinations thereof.

In various aspects, the negative electroactive material particles 50 may include a lithium-containing negative electroactive material, such as a lithium alloy. In other variations, the negative electroactive material particles 50 may include, for example only, a carbonaceous negative electroactive material (such as, graphite, hard carbon, soft carbon, and the like) and/or a metallic negative electroactive material (such as tin, aluminum, magnesium, germanium, and alloys thereof, and the like). In further variations, the negative electroactive material particles 50 may include a silicon-based negative electroactive material.

In still further variations, although not illustrated, the negative electrode 22 may be a composite electrode including a combination of negative electroactive materials. For example, the negative electrode 22 may include a first plurality of negative electroactive material particles and a second plurality of negative electroactive material particles. In certain variations, a ratio of the first negative electroactive material defining the first plurality of negative electroactive material particles to the second negative electroactive material defining the second plurality of negative electroactive material particles may be greater than or equal to about 5:95 to less than or equal to about 95:5. The first and second negative electroactive materials may be independently selected from the group including, for example, lithium, lithium alloys, carbonaceous negative electroactive materials (such as, graphite, hard carbon, soft carbon, and the like), metallic negative electroactive materials (such as tin, aluminum, magnesium, germanium, and alloys thereof, and the like), and silicon-based negative electroactive material.

Although not illustrated, it should be understood that, in certain variations, the negative electrode 22 may further include an electronically conductive material (i.e. conductive additive) that provides an electron conductive path and/or a polymeric binder material that improves the structural integrity of the negative electrode 22. For example, the negative electrode 22 may include greater than or equal to about 30 wt. % to less than or equal to about 98 wt. %, and in certain aspects, optionally greater than or equal to about 60 wt. % to less than or equal to about 95 wt. %, of the negative electroactive material; greater than or equal to 0 wt. % to less than or equal to about 30 wt. %, and in certain aspects, optionally greater than or equal to about 0.5 wt. % to less than or equal to about 10 wt. %, of the electronically conducting material; and greater than or equal to 0 wt. % to less than or equal to about 20 wt. %, and in certain aspects, optionally greater than or equal to about 0.5 wt. % to less than or equal to about 10 wt. %, of the polymeric binder.

Example polymeric binders include polyimide, polyamic acid, polyamide, polysulfone, polyvinylidene difluoride (PVdF), polytetrafluoroethylene (PTFE), polyacrylic acid (PAA), blends of polyvinylidene fluoride and polyhexafluoropropene, polychlorotrifluoroethylene, ethylene propylene diene monomer (EPDM) rubber, carboxymethyl cellulose (CMC), nitrile butadiene rubber (NBR), styrene-butadiene rubber (SBR), lithium polyacrylate (LiPAA), sodium polyacrylate (NaPAA), sodium alginate, and/or lithium alginate. Electronically conducting materials may include, for example, carbon-based materials, powdered nickel or other metal particles, or conductive polymers. Carbon-based materials may include, for example, particles of graphite, acetylene black (such as KETCHEN™ black or DENKA™ black), carbon nanofibers and nanotubes (e.g., single wall carbon nanotubes (SWCNT), multiwall carbon nanotubes (MWCNT)), graphene (e.g., graphene platelets (GNP), oxidized graphene platelets), conductive carbon blacks (such as, SuperP (SP)), and the like. Examples of a conductive polymer include polyaniline, polythiophene, polyacetylene, polypyrrole, and the like.

The positive electrode 24 is formed from a lithium-based active material that is capable of undergoing lithium intercalation and deintercalation, alloying and dealloying, or plating and stripping, while functioning as the positive terminal of a lithium-ion battery. In various aspects, as illustrated, the positive electrode 24 may be defined by a plurality of positive electroactive material particles 60. Such positive electroactive material particles 60 may be disposed in one or more layers so as to define the three-dimensional structure of the positive electrode 24. In certain variations, as illustrated, the positive electrode 24 may be a composite electrode comprising a third plurality of solid-state electrolyte particles 92 in combination with the positive electroactive material particles 60. For example, the positive electrode 24 may include greater than or equal to about 30 wt. % to less than or equal to about 98 wt. %, and in certain aspects, optionally greater than or equal to about 50 wt. % to less than or equal to about 95 wt. %, of the positive solid-state electroactive particles 60 and greater than or equal to about 0 wt. % to less than or equal to about 50 wt. %, and in certain aspects, optionally greater than or equal to about 5 wt. % to less than or equal to about 20 wt. %, of the third plurality of solid-state electrolyte particles 92. In each instance, the positive electrode 24 (including the one or more layers) may have an average thickness greater than or equal to about 1 μm to less than or equal to about 500 μm, and in certain aspects, optionally greater than or equal to about 10 μm to less than or equal to about 200 μm.

The third plurality of solid-state electrolyte particles 92 may be the same as or different from the first plurality of solid-state electrolyte particles 30 and/or the second plurality of solid-state electrolyte particles 90. For example, in certain variations, like the solid-state electrolyte particles 30 and/or the soldi-state electrolyte particles 90, the solid-state electrolyte particles 92 may include ceramic particles. In other variations, the solid-state electrolyte particles 92 may include, additionally or alternatively, sulfide-based particles, oxide-based particles, metal-doped or aliovalent-substituted oxide particles, nitride-based particles, hydride-based particles, halide-based particles, and/or borate-based particles.

In various aspects, the positive electroactive material particles 60 may include a layered oxide represented by $LiMeO_2$, where Me is a transition metal, such as cobalt (Co), nickel (Ni), manganese (Mn), iron (Fe), aluminum (Al), vanadium (V), or combinations thereof. In other variations, the positive electroactive material particles 60 include an olivine-type oxide represented by $LiMePO_4$, where Me is a transition metal, such as cobalt (Co), nickel (Ni), manganese (Mn), iron (Fe), aluminμm (Al), vanadium (V), or combinations thereof. In still other variations, the positive electroactive material particles 60 include a monoclinic-type oxide represented by $Li_3Me_2(PO_4)_3$, where Me is a transition metal, such as cobalt (Co), nickel (Ni), manganese (Mn), iron (Fe), aluminum (Al), vanadium (V), or combinations thereof. In still other variations, the positive electroactive material particles 60 include a spinel-type oxide represented by $LiMe_2O_4$, where Me is a transition metal, such as cobalt (Co), nickel (Ni), manganese (Mn), iron (Fe), aluminum (Al), vanadium (V), or combinations thereof. In still other variations, the positive electroactive material particles 60 includes a tavorite represented by $LiMeSO_4F$ and/or $LiMePO_4F$, where Me is a transition metal, such as cobalt (Co), nickel (Ni), manganese (Mn), iron (Fe), aluminum (Al), vanadium (V), or combinations thereof.

In still further variations, although not illustrated, the positive electrode 24 may be a composite electrode including a combination of positive electroactive materials. For example, the positive electrode 24 may include a first plurality of positive electroactive material particles and a second plurality of positive electroactive material particles. In certain variations, a ratio of the first positive electroactive material defining the first plurality of positive electroactive material particles to the second positive electroactive material defining the second plurality of positive electroactive material particles may be greater than or equal to about 5:95 to less than or equal to about 95:5. The first and second positive electroactive materials may be independently selected from the group including, for example, layered oxides, olivine-type oxides, monoclinic-type oxides, spinel-type oxide, and/or tavorite.

Although not illustrated, it should be understood that, in certain variations, the positive electrode 24 may further include an electronically conductive material (i.e. conductive additive) that provides an electron conductive path and/or a polymeric binder material that improves the structural integrity of the positive electrode 24. For example, the positive electrode 24 may include greater than or equal to about 30 wt. % to less than or equal to about 98 wt. %, and in certain aspects, optionally greater than or equal to about 60 wt. % to less than or equal to about 95 wt. %, of the positive electroactive material; greater than or equal to 0 wt. % to less than or equal to about 30 wt. %, and in certain aspects, optionally greater than or equal to about 0.5 wt. % to less than or equal to about 10 wt. %, of the electronically conducting material; and greater than or equal to 0 wt. % to less than or equal to about 20 wt. %, and in certain aspects, optionally greater than or equal to about 0.5 wt. % to less than or equal to about 10 wt. %, of the polymeric binder. The conductive additive and/or binder material as included in the positive electrode 24 may be the same as or different from the conductive additive and/or binder material as included in the negative electrode 22.

Figure 4:
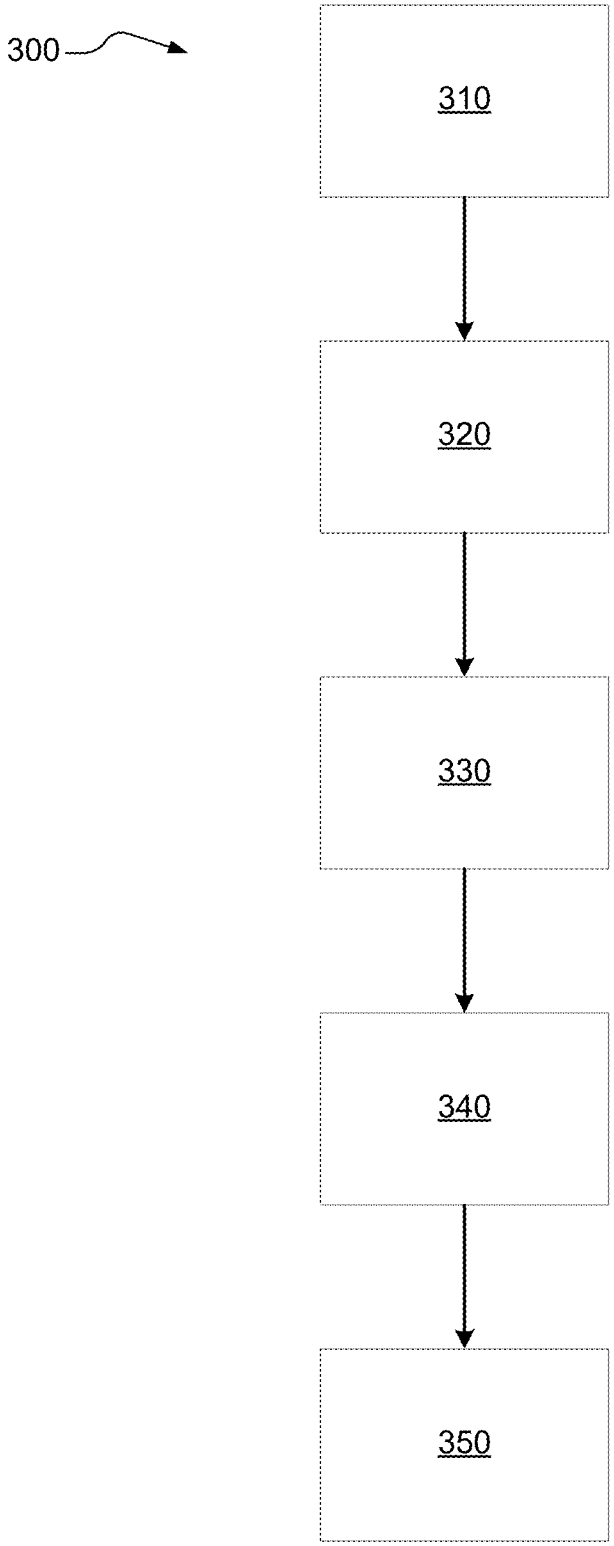
FIG. 4 is a flowchart illustrating an example method for preparing an example hybrid solid-state electrolyte in accordance with various aspects of the present disclosure.

In various aspects, the present disclosure provides methods for preparing a multi-layered, hybrid solid-state electrolyte layer. For example, FIG. 4 illustrates an example method 300 for preparing a multi-layered, hybrid solid-state electrolyte layer like the multi-layered, hybrid solid-state electrolyte 126 illustrated in FIG. 3. The method 300 may include contacting 330 an interfacial material with one or more surfaces of a polymeric layer (like the polymeric layer 131 illustrated in FIG. 3) or a ceramic layer (like the ceramic layer 130 illustrated in FIG. 3) to form an interfacial layer. In certain variations, the contacting 330 may including a drop casting process, a dip coating process, a spin coating process, a solvent casting process, or any other solution-based coating technique. In each instance the method 300 further includes contacting 350 the other of the polymeric layer or the ceramic layer to an exposed surface of the interfacial layer.

In some variations, the method 300 may also include preparing 320 a surface of the polymeric layer or the ceramic layer to receive the interfacial material, including, for example, ensuing the receiving surface(s) is substantially clear of any contaminant or passivating materials or layers. In certain variations, the method 300 may also include preparing 340 a surface of the other of the polymeric layer or the ceramic layer prior to contacting 350 with the interfacial layer, including, for example, ensuing the receiving surface(s) is substantially clear of any contaminant or passivating materials or layers. In each instance, the surface(s) may be prepared 320, 340 using a mechanical polishing process, a chemical process (e.g., atomic layer deposition (ALD), acid or plasma treatments), and/or thermal process. It should be appreciated that preparing 320 the surface(s) of the polymeric layer or the ceramic layer and preparing 340 the surface(s) of the other of the polymeric layer or the ceramic layer may occur concurrently or consecutively.

In some variations, the method 300 may also include preparing 310 the interfacial material. It should be appreciated that preparing 310 the interfacial material may occur concurrently or consecutively with the preparation 320 of the surface(s) of the polymeric layer or the ceramic layer and/or the preparation 340 of the surface(s) of the other of the polymeric layer or the ceramic layer. In each instance, preparing 310 the interfacial material may include contacting (e.g., mixing) the dopamine and second monomer in a solution having a fixed basic pH, for example of about 8.5, which will help to initiate the copolymerization process.

Certain features of the current technology are further illustrated in the following non-limiting examples.

Example 1

Example batteries and battery cells may be prepared in accordance with various aspects of the present disclosure. For example, an example cell 510 may include a multi-layered, hybrid solid-state electrolyte layer, like the multi-layered, hybrid solid-state electrolyte 126 illustrated in FIG. 3. The multi-layered, hybrid solid-state electrolyte layer of the first example cell 510 may include a polymeric layer that includes, for example, polyethylene oxide (PEO), a ceramic layer that includes, for example, lithium lanthanum zirconium oxide ($Li_7La_3Zr_2O_7$) (LLZO), and an interfacial layer disposed therebetween that includes dopamine (e.g., polydopamine (PDA)) second monomer (e.g., functionalized or amine-containing polymer) that forms a polymeric moiety that has similar structure to the polymeric layer. A first comparative cell 520 may include a hybrid solid-state electrolyte layer that includes a polymeric layer that includes, for example, polyethylene oxide (PEO), and a ceramic layer that includes, for example, lithium lanthanum zirconium oxide ($Li_7La_3Zr_2O_7$) (LLZO), but omits the interfacial layer. A second comparative cell 520 may include a solid-state electrolyte layer that includes only the ceramic material (e.g., lithium lanthanum zirconium oxide ($Li_7La_3Zr_2O_7$) (LLZO)).

Figure 5A:
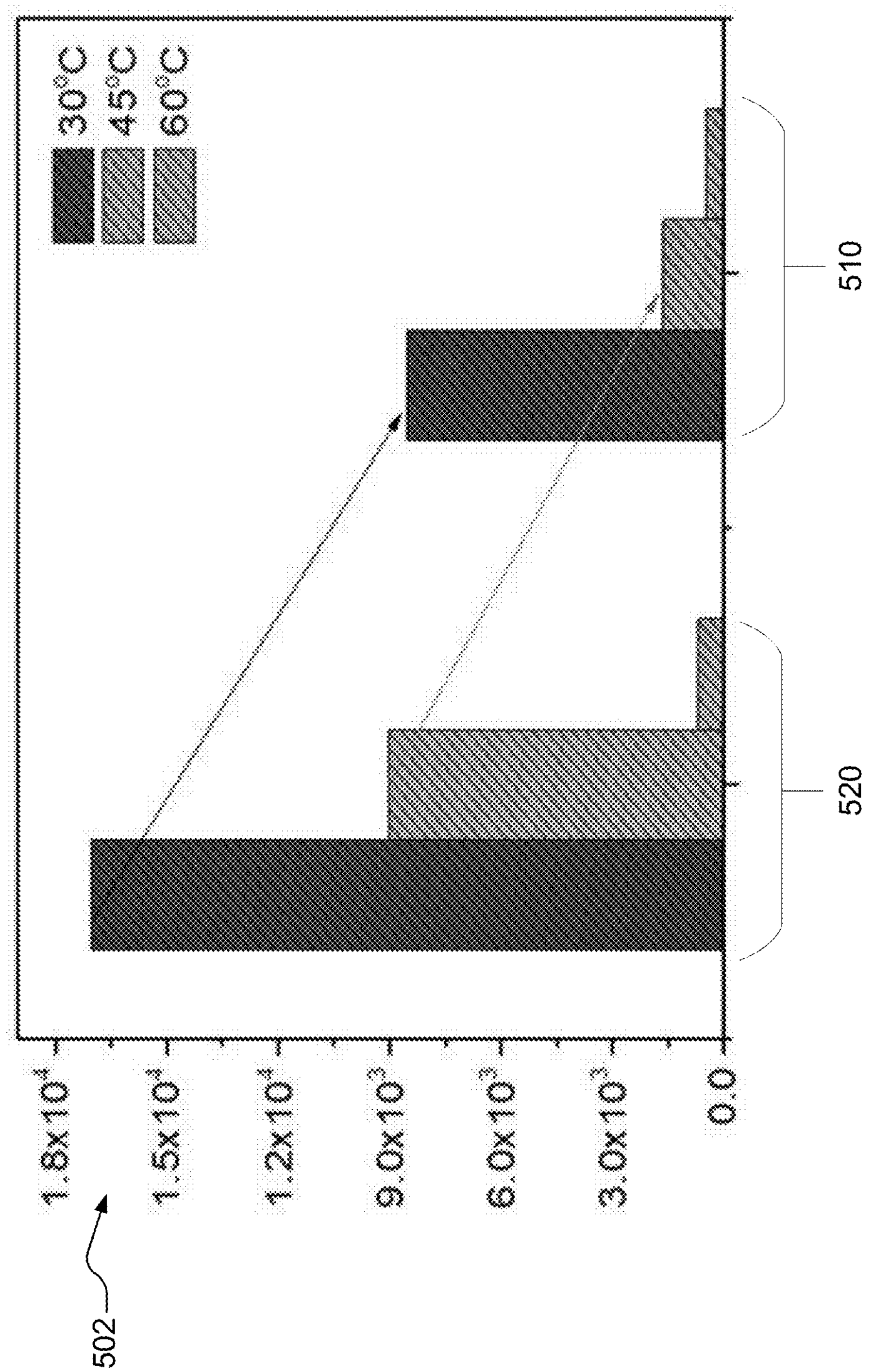
FIG. 5A is a graphical illustrating demonstrating the interfacial resistivity of an example cell including a hybrid solid-state electrolyte layer in accordance with various aspects of the present disclosure.
Figure 5B:
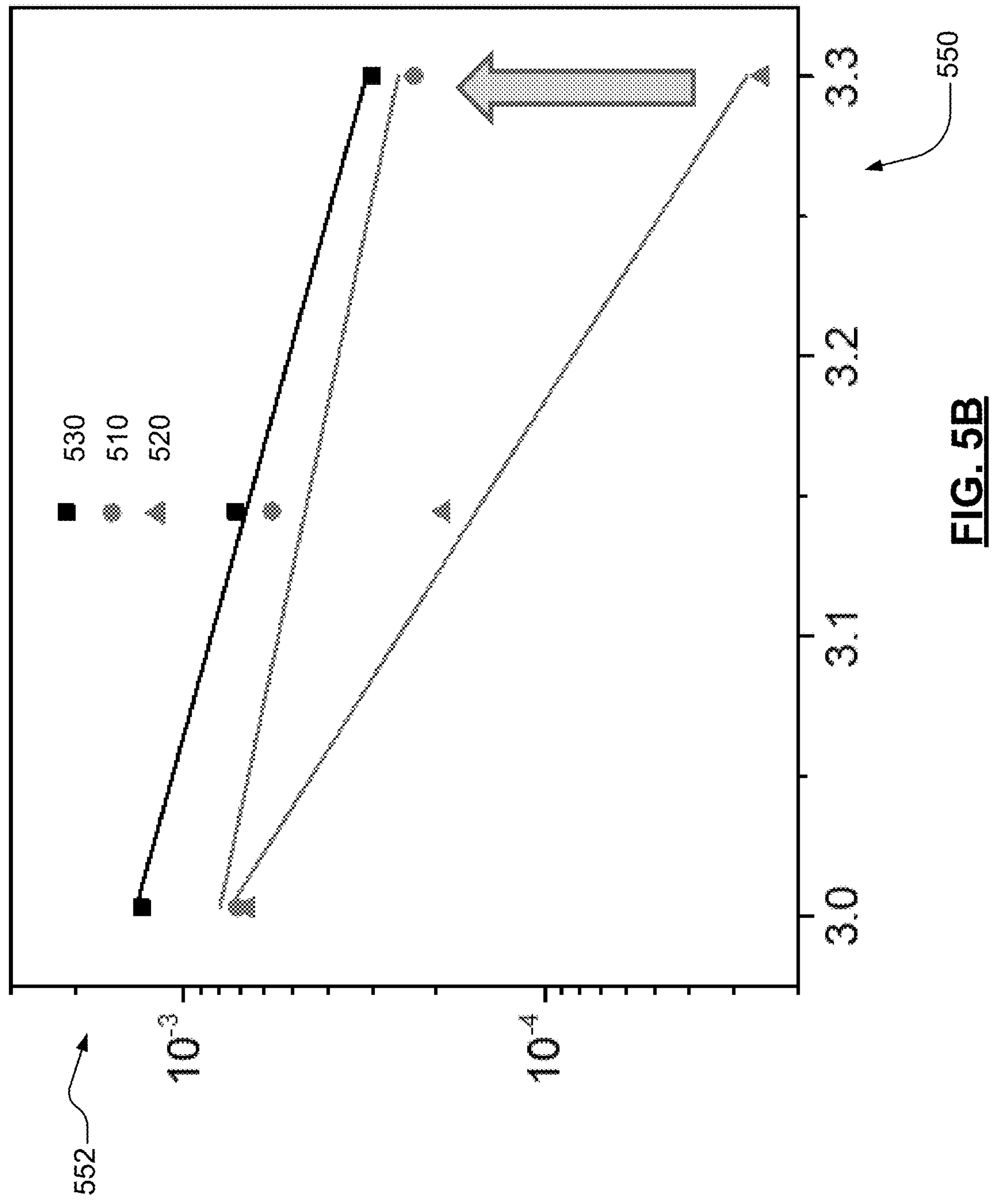
FIG. 5B is a graphical illustrating demonstrating the reduction of interfacial resistance at different temperatures of an example cell including a hybrid solid-state electrolyte layer in accordance with various aspects of the present disclosure.

FIG. 5A is a graphical illustrating demonstrating the interfacial resistivity of the example cell 510 as compared to the first comparative cell 520, where the y-axis 502 represents interfacial resistivity (Ω); and FIG. 5B is a graphical illustrating demonstrating the conductivity trend and Arrhenius plot of the example cell 510 as compared to the first comparative cell 520 and also the second comparative cell 530, were the x-axis 550 represents 1000/T (1/K) and the y-axis 552 represents log σ ($S\cdot cm^{-1}$). As illustrated, the example cell 510 has an improvement of about 50% in interfacial resistance, and the conductivity performance has improved most notably at lower temperatures (e.g., about 30° C.).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A hybrid solid-state electrolyte layer for use in an electrochemical cell that cycles lithium ions, the hybrid solid-state electrolyte layer comprising:

a polymeric material defining a polymeric matrix;

a solid-state electrolyte ceramic material defining a plurality of solid-state electrolyte ceramic particles, the plurality of solid-state electrolyte ceramic particles dispersed in the polymeric matrix; and an interfacial material adhering the polymeric material and the solid-state electrolyte ceramic material by coating the plurality of solid-state electrolyte ceramic particles, the interfacial material comprising a branched copolymer that comprises dopamine and a second monomer.

2. The hybrid solid-state electrolyte layer of claim 1, wherein the hybrid solid-state electrolyte layer comprises:

greater than or equal to about 20 wt. % to less than or equal to about 90 wt. % of the polymeric material;

greater than or equal to about 10 wt. % to less than or equal to about 80 wt. % of the solid-state electrolyte ceramic material; and greater than or equal to about 0.01 wt. % to less than or equal to about 1 wt. % of the interfacial material.

3. The hybrid solid-state electrolyte layer of claim 1, wherein the hybrid solid-state electrolyte layer has an average thickness greater than or equal to about 5 micrometers to less than or equal to about 200 micrometers.

4. The hybrid solid-state electrolyte layer of claim 1, wherein the solid-state electrolyte ceramic particles have an average particle size greater than or equal to about 10 nanometers to less than or equal to about 10 micrometers, and the interfacial material has an average thickness greater than or equal to about 2 nanometers to less than or equal to about 10 nanometers.

5. The hybrid solid-state electrolyte layer of claim 1, wherein the polymeric material is selected from the group consisting of: polyethylene oxide (PEO), poly(methacrylic acid) (PMMA), poly(vinylidene fluoride) (PVDF), poly(vinylidene fluoride)-co-hexafluoropropylene (PVDF-HFP), poly(acrylonitrile) (PAN), poly(2-vinylpyridine) (P2VP), polyethylenimine (PEI), poly(propylene oxide) (PPO), and combinations thereof.

6. The hybrid solid-state electrolyte layer of claim 1, wherein the solid-state electrolyte ceramic material is selected from the group consisting of: lithium lanthanum zirconium oxide, lithium lanthanum titanate, lithium zinc germanate, and combinations thereof.

7. The hybrid solid-state electrolyte layer of claim 1, wherein the second monomer forms a polymeric moiety in the copolymer selected from the group consisting of: polyethylene oxide (PEO), poly(methacrylic acid) (PMMA), poly(vinylidene fluoride) (PVDF), poly(vinylidene fluoride)-co-hexafluoropropylene (PVDF-HFP), poly(acrylonitrile) (PAN), poly(2-vinylpyridine) (P2VP), polyethylenimine (PEI), poly(propylene oxide) (PPO), and combinations thereof.

8. The hybrid solid-state electrolyte layer of claim 1, wherein the solid-state electrolyte ceramic material is selected from the group consisting of: $Li_7La_3Zr_2O_{12}$, $Li_{0.33}La_{0.56}TiO_3$, $Li_{14}Zn(GeO_4)_4$, and combinations thereof.

9. A hybrid solid-state electrolyte layer for use in an electrochemical cell that cycles lithium ions, the hybrid solid-state electrolyte layer comprising:

a first polymeric material defining a polymeric matrix;

a plurality of solid-state electrolyte ceramic material particles; and an interfacial material adhering the polymeric matrix to the solid-state electrolyte ceramic material particles, the interfacial material comprising a branched copolymer that comprises dopamine and a second monomer that forms a second polymeric moiety, wherein the first polymeric material and the second polymeric moiety are the same.

10. The hybrid solid-state electrolyte layer of claim 9, wherein the polymeric matrix forms a first layer, the plurality of solid-state electrolyte ceramic material particles form a second layer, and the interfacial material defines a third layer disposed between the first layer and the second layer.

11. The hybrid solid-state electrolyte layer of claim 10, wherein the first layer has an average thickness greater than or equal to about 1 micrometer to less than or equal to about 120 micrometers, the second layer has an average thickness greater than or equal to about 5 micrometers to less than or equal to about 1000 micrometers, and the third layer has an average thickness greater than or equal to about 10 nanometers to less than or equal to about 10 micrometers.

12. The hybrid solid-state electrolyte layer of claim 9, wherein the plurality of solid-state electrolyte ceramic material particles is dispersed in the polymeric matrix and the interfacial material coats the solid-state electrolyte ceramic material particles.

13. The hybrid solid-state electrolyte layer of claim 12, wherein the polymeric matrix has an average thickness greater than or equal to about 5 micrometers to less than or equal to about 200 micrometers, the solid-state electrolyte ceramic particles have an average particle size greater than or equal to about 10 nanometers to less than or equal to about 10 micrometers, and the interfacial material has an average thickness greater than or equal to about 2 nanometers to less than or equal to about 10 nanometers.

14. The hybrid solid-state electrolyte layer of claim 9, wherein the first polymeric material and the second polymeric moiety are selected from the group consisting of: polyethylene oxide (PEO), poly(methacrylic acid) (PMMA), poly(vinylidene fluoride) (PVDF), poly(vinylidene fluoride)-co-hexafluoropropylene (PVDF-HFP), poly(acrylonitrile) (PAN), poly(2-vinylpyridine) (P2VP), polyethylenimine (PEI), poly(propylene oxide) (PPO), and combinations thereof, and the ceramic material particles comprise a ceramic material selected from the group consisting of: lithium lanthanum zirconium oxide, lithium lanthanum titanate, lithium zinc germanate, and combinations thereof.

15. A method for forming a hybrid solid-state electrolyte layer for use in an electrochemical cell that cycles lithium ions, the method comprising:

preparing a receiving surface on a solid-state electrolyte ceramic material, the solid-state electrolyte ceramic material defining a plurality of solid-state electrolyte ceramic particles; and contacting an interfacial material to the receiving surface, the interfacial material comprising a branched copolymer that comprises dopamine and a second polymeric moiety selected from the group consisting of: polyethylene oxide (PEO), poly(methacrylic acid) (PMMA), poly(vinylidene fluoride) (PVDF), poly(vinylidene fluoride)-co-hexafluoropropylene (PVDF-HFP), poly (acrylonitrile) (PAN), poly(2-vinylpyridine) (P2VP), polyethylenimine (PEI), poly(propylene oxide) (PPO), and combinations thereof.

16. The method of claim 15, wherein the preparing comprises treating the surface to remove contaminants and passivating materials.

17. The method of claim 15, wherein the contacting comprises a solution-based coating process.

18. The method of claim 15, wherein the receiving surface is on the ceramic material and the method further comprises:

contacting the interfacial material with a polymeric material.

* * * * *